United States Patent [19]

Fodale et al.

[11] Patent Number: 4,932,777

[45] Date of Patent: Jun. 12, 1990

[54] ELECTRO-OPTICAL SPIN MEASUREMENT SYSTEM

[75] Inventors: Robert Fodale, Massapequa; Herbert R. Hampton, Hauppauge, both of N.Y.

[73] Assignee: The United States of America as represented by the Administrator of the National Aeronautics and Space Administration, Washington, D.C.

[21] Appl. No.: 251,411

[22] Filed: Sep. 30, 1988

[51] Int. Cl.$^5$ .......................... G01C 1/00; G01M 9/00
[52] U.S. Cl. ...................................... 356/152; 33/263; 73/147; 342/54; 356/1; 356/141; 364/433; 364/435
[58] Field of Search ...................... 342/54; 356/20, 21, 356/138, 147, 1, 4, 28, 141, 152; 33/263, 341; 73/147; 250/203 R; 364/433–435; 244/171

[56] References Cited

U.S. PATENT DOCUMENTS

| | | | |
|---|---|---|---|
| 3,282,093 | 11/1966 | Rehder | 356/51 |
| 3,678,283 | 7/1972 | LaBaw | 356/152 X |
| 3,712,562 | 1/1973 | Alpers | 250/203 X |
| 3,917,412 | 11/1975 | Stoutmeyer et al. | 356/152 |
| 4,047,816 | 9/1977 | Pell et al. | 356/152 |
| 4,086,808 | 5/1978 | Camac et al. | |
| 4,111,555 | 9/1978 | Ellis | 356/152 X |
| 4,123,165 | 10/1978 | Brown et al. | 356/152 |
| 4,136,560 | 1/1979 | Seymour et al. | 356/141 X |
| 4,168,123 | 9/1979 | Price | 356/152 |
| 4,193,689 | 3/1980 | Reymond et al. | 356/152 |
| 4,209,254 | 6/1980 | Reymond et al. | 356/152 |
| 4,649,504 | 3/1987 | Krouglicof et al. | 356/141 X |
| 4,710,028 | 12/1987 | Grenier et al. | 356/141 X |
| 4,738,531 | 4/1988 | Lloyd et al. | 356/152 |
| 4,769,539 | 9/1988 | Thurston | 356/152 X |
| 4,840,069 | 6/1989 | Hampton et al. | 356/141 X |

OTHER PUBLICATIONS

American Institute of Aeronautics and Astronautics, "In-Flight Deflection Measurement of the HiMat Aeroelastically Tailored Wing", V. DeAngelis, pp. 1, 3, 5, 7 and 9.
"Flight Deflection Measurement System (Non-Contacting)", H. Hampton et al., pp. 1-5.

Primary Examiner—Thomas H. Tarcza
Assistant Examiner—Linda J. Wallace
Attorney, Agent, or Firm—George F. Helfrich; John R. Manning; Charles E. B. Glenn

[57] ABSTRACT

An electro-optical spin measurement system for a spin model in a spin tunnel includes a radio controlled receiver/transmitter, targets located on the spin model, optical receivers mounted around the perimeter of the spin tunnel and the base of the spin tunnel for receiving data from the targets, and a control system for accumulating data from the radio controlled receiver and receivers. Six targets are employed. The spin model includes a fuselage, wings, nose and tail. Two targets are located under the fuselage of the spin model at the nose tip and tail, two targets are located on the side of the fuselage at the nose tip and tail, and a target is located under each wing tip. The targets under the fuselage at the nose tip and tail measure spin rate of the spin model, targets on the side of the fuselage at the nose tip and tail measure angle of attack of the spin model, and the targets under the wing tips measure roll angle of the spin model. Optical receivers are mounted at 90° increments around the periphery of the spin tunnel to determine angle of attack and roll angle measurements of the spin model and optical receivers are mounted at the base of the spin tunnel to define quadrant and position of the spin model and to determine the spin rate of the spin model.

8 Claims, 3 Drawing Sheets

ELECTRO-OPTICAL SPIN MEASUREMENT SYSTEM

ORIGIN OF THE INVENTION

The invention described herein was made in the performance of work under a NASA Contract and is subject to the provisions of Section 305 of the National Aeronautics and Space Act of 1958, as amended, Public Law 85-568 (72 Stat. 435; 42 USC 2457).

CROSS REFERENCE TO RELATED APPLICATION

This application is cross-referenced to U.S. Ser. No. 07/251,438, filed Sept. 30, 1988, now U.S. Pat. No. 4,896,533, to Robert Fodale et al., and entitled "Miniaturization of Flight Deflection Measurement System".

BACKGROUND OF THE INVENTION

1. Field of the Invention

The present invention is directed to an electro-optical spin measurement system which tracks a model, such as a model aircraft, in order to determine spin rate, angle of attack, and roll angle of the model within the confines of a vertical spin tunnel. A model used in this system is hereinafter referred to as a "spin model".

2. Description of the Related Art

Various measurement systems for determining attitude, position, alignment, etc., of weapon systems or tracking devices have been developed. The most recent systems employ photodetectors and light emitting diodes.

Prior art flight deflection measurement systems employ strain gauges, accelerometers, or cinematographic/videographic techniques. All of these techniques have various drawbacks such as low, non-repeatable strain levels, are not suitable for steady state or low frequency wing deflections, or have poor resolution and low accuracy, respectively. Therefore, an electro-optical wing deflection measurement system was developed (see *Flight Deflection Measurement System (Non-Contacting)*, Hampton et al AIAA Proceedings, Colorado Springs, Co., (Mar. 17, 1980). The system includes a receiver, control unit, target drivers, targets, ground display units, and a power supply. The receiver employs a cylindrical lens configuration to image each target as a line (see U.S. Pat. No. 4,136,568 to Seymour). The system is employed to measure the deflection and bending moment of a wing under various conditions.

SUMMARY OF THE INVENTION

An object of the present invention is to accurately track a spin model in all six degrees of freedom.

Another object of the present invention is to accurately track a spin model and preserve the model's ability to spin freely within a spin tunnel.

A further object of the present invention is to accurately track a spin model so as to obtain more accurate test results than prior art systems.

Another object of the present invention is to provide a lower cost system for tracking a spin model than that of prior art devices.

A further object of the present invention is to provide a spin measurement system which obtains data faster than prior art systems.

The above-mentioned objects of the present invention are obtained by providing an electro-optical spin measurement system which includes a radio controlled receiver/transmitter system (see cross-referenced application having U.S. Ser. No. 07/251,438, filed Sept. 30, 1988, Robert Fodale et al., entitled "Miniaturization of Flight Deflection Measurement System"), target means located on the spin model, optical receiver means mounted around the perimeter of the spin tunnel and mounted at the base of the spin tunnel for defining the position of the spin model, and control means for transmitting signals to the radio controlled, receiver/transmitter means and accumulating data from the optical receiver means.

The spin model includes a fuselage, wings, tail and nose. Six target means are employed: two target means are located under the fuselage at the nose tip and tail of the spin model, two target means are located at the side of the fuselage at the nose tip and tail of the spin model, and a target means is located at the tip of each wing. The two target means under the fuselage at the nose tip and tail measure spin rate, the two target means at the side of the fuselage at the nose tip and tail measure angle of attack, and the target means at each wing tip measure roll angle. Optical receiver means are mounted at 90° increments within the spin tunnel and are mounted at the base of the spin tunnel. The optical receiver means mounted at 90° increments within the spin tunnel collect data for calculating the angle of attack and roll angle of the model. The optical receiver means mounted at the base of the spin tunnel determine the spin rate of the model. Only one target need be tracked for determining the spin rate.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
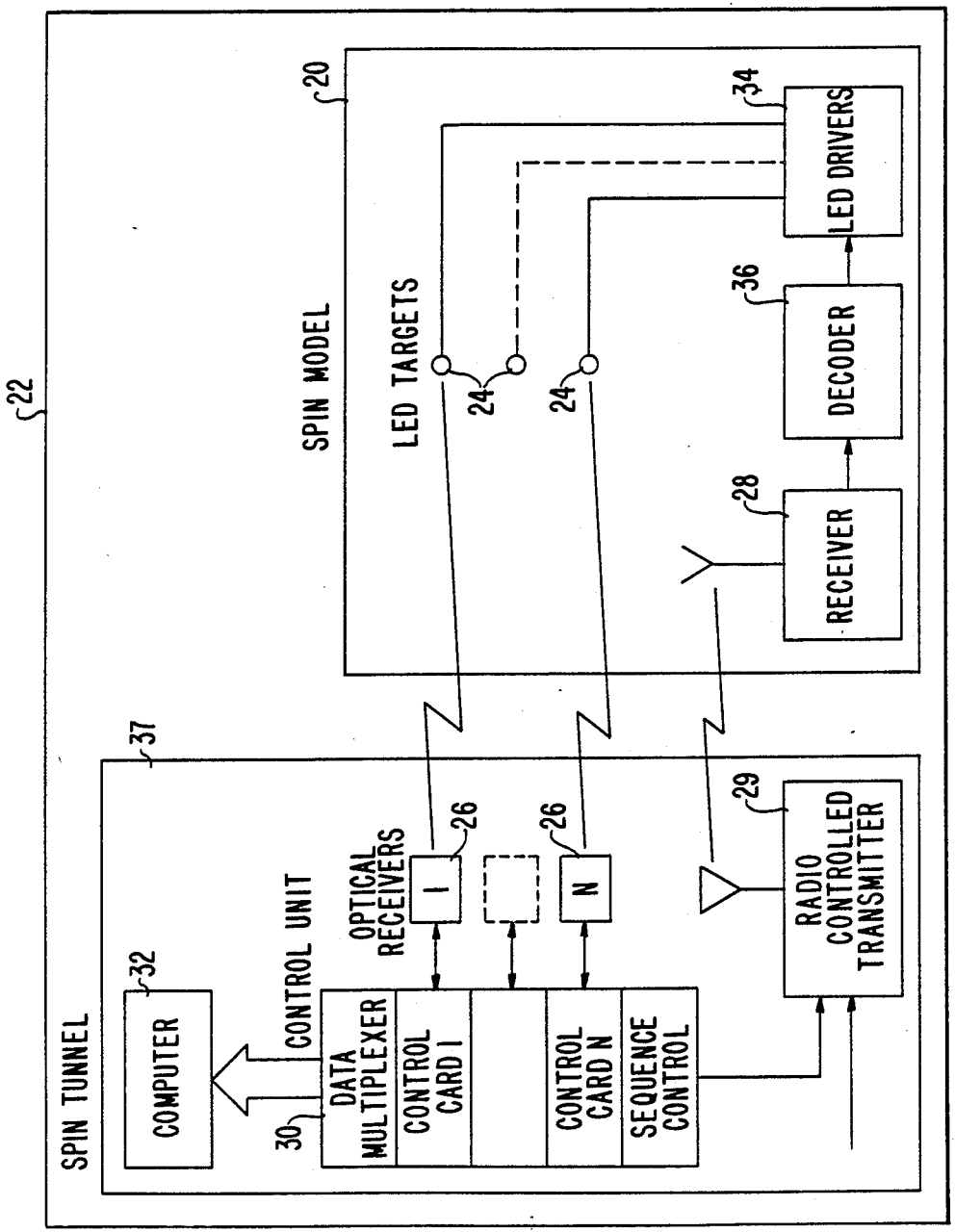
FIG. 1 is a block diagram of an electro-optical spin measurement system (SMS) according to the present invention.

The present invention is directed to an electro-optical spin measurement system shown in FIG. 1. A spin model 20 and spin tunnel 22 are shown. The spin model 20 includes a receiver 28 which receives signals from a radio controlled transmitter 29 in the spin tunnel 22, a decoder 36 which is attached to the receiver 28 for decoding the signals from the transmitter 29, and a light emitting diode (LED) driver 34 which receives signals from the decoder 36 and drives LED targets 24. The spin tunnel observation area installation 37 includes optical receivers 26 which receive signals from the LED targets 24 and a control unit 30 which receives signals from the optical receivers 26 and determines various parameters, such as spin rate, angle of attack and roll angle of the spin model 20. The control unit 30 inputs the collected data from the optical receivers 26 into a computer 32 to obtain desired data. The control unit 30 also supplies command and control signals required by the receiver 28 and sequencing commands to the targets 24 via the radio controlled transmitter 29.

Optical targets are employed so as to preserve the spin model's ability to spin freely within the confines of the spin tunnel 22. LED targets 24 are employed because of their small size and low power consumption. Any suitable optical device, however, can be employed.

An example of the type of flight deflection measurement system which can be employed is set forth in the above-mentioned cross-referenced application having U.S. Ser. No. 07/251,438, filed Sept. 30, 1988, to Robert Fodale et al., and entitled "Miniaturization of Flight Deflection Measurement System", and includes a radio controlled receiver/transmitter system so that commands from the control unit can be relayed to the model via a radio link. This preserves the spin model's ability to spin freely within the spin tunnel 22 and collect accurate data without any interference.

The optical receivers 26 are integrated simultaneously (in parallel) by the control unit 30. The acquired positional data is stored in the computer 32, which is a micro/mini computer, for later processing. Each frame of data contains two data words per receiver. One word for receiver identification, status and target identification, and one word for data. The identification and data words require, for example, a minimum of 10 bits each. Assuming a 1 MHz clock rate, it takes approximately 4 milliseconds to acquire data from the optical receivers 26. A frame time of 4 milliseconds defines the maximum model position data rate of 38 per second. Thirty-eight data points per second assumes six targets plus two milliseconds for model surface servo control. This data is stored and manipulated by the computer 32 and is employed, at a minimum, to determine and output spin model pitch angle, roll angle and rotational rate.

The six targets employed on the model are located as follows. Two targets are located under the fuselage at the nose tip and the tail so that the spin rate may be measured. Two targets are located on the side of the fuselage at the nose tip and the tail so that the angle of attack may be measured. The remaining two targets are located at each wing tip so that the roll angle may be measured.

Figure 2:
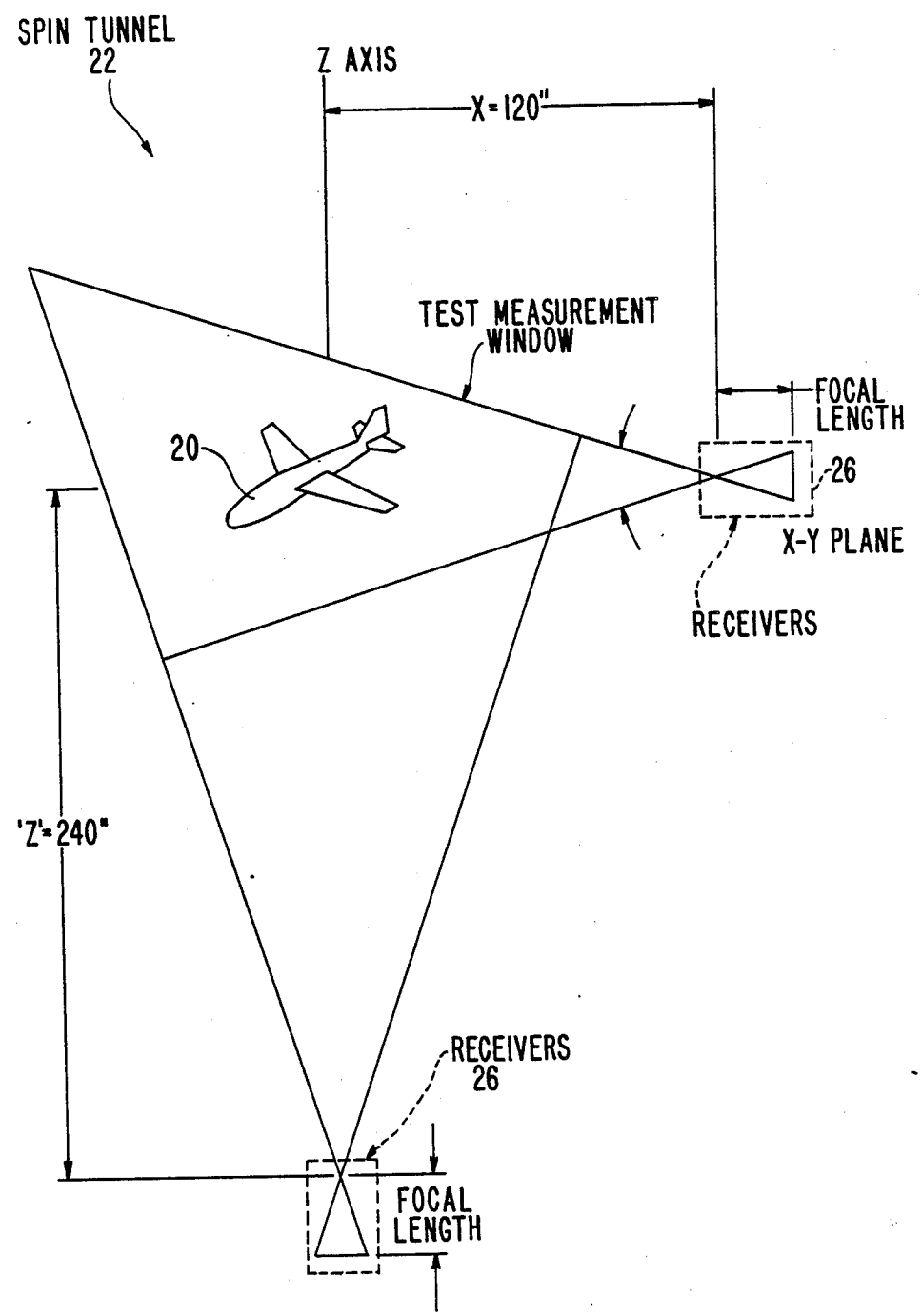
FIG. 2 is a diagram of the spin tunnel with a spin model therein, and receivers at various axes within the spin tunnel of the SMS in FIG. 1.
Figure 3A:
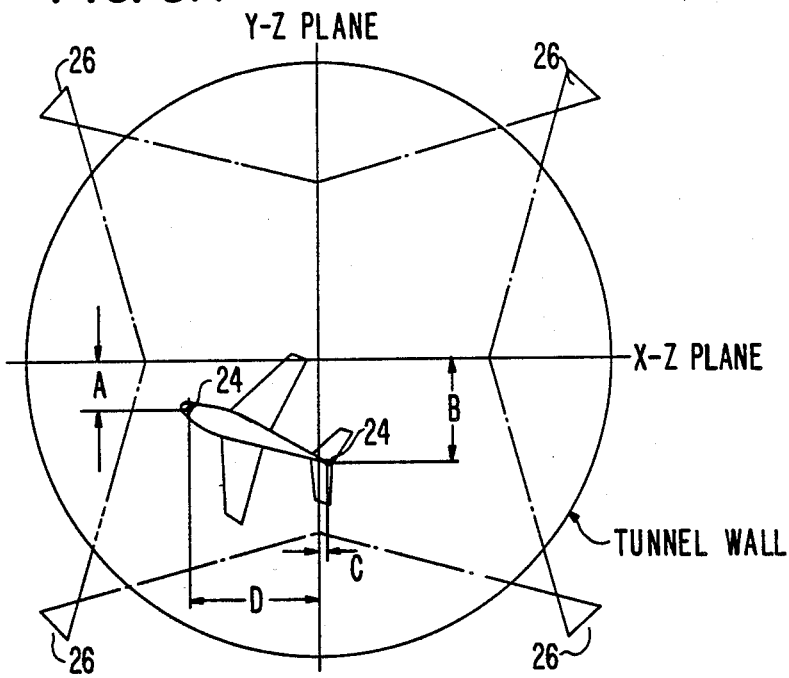
FIG. 3(A) is a plan view of the spin tunnel in FIG. 2.

The optical receivers 26 are mounted at 90° increments around the perimeter of an observation area 37 of the spin tunnel 22 (FIGS. 2 and 3A). This divides the tunnel throat area into four equal quadrants. The optical receivers 26 acquire data points needed to calculate the angle of attack and roll angle. FIG. 2 shows the spin model 20 and the location of various optical receivers 26 within the spin tunnel 22. Four additional optical receivers 26 are mounted at the base of the spin tunnel 22 so as to define the quadrant and position of the spin model 20. The data from the optical receivers 26 mounted at the base of the spin tunnel will also determine the spin rate of the spin model 20.

In order to measure the spin rate, only one of the targets 24 needs to be tracked. Since the optical receivers 26 are sensitive to motion in only one axis, the rotating motion of the targets 24 is converted into a vertical displacement on the face of a linear array within the optical receivers 26. This linear displacement, when plotted with respect to time, produces a sine wave having a period equal to one revolution of the spin mode 20.

$$\text{Spin rate (Hz)} = \frac{1}{\text{period (ms)}} \quad (1)$$

Figure 3B:
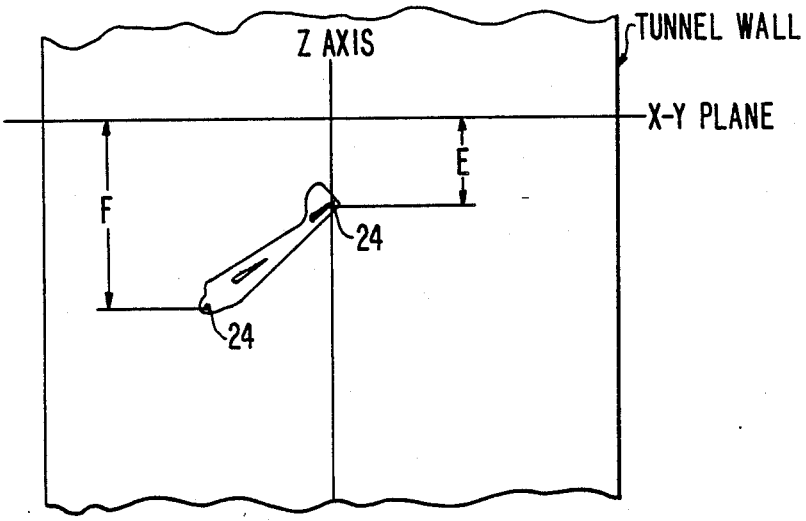
FIG. 3(B) is a cross-sectional side view of the spin tunnel in FIG. 3(A).

The angle of attack and roll angle is calculated from data extracted from one of the four optical receivers 26 mounted on the perimeter of the spin tunnel 22 in the X-Y plane. Since system resolution is greatest when the spin mode-to-receiver separation is smallest (this is common to all optical systems), the data used is taken from the receiver which is closest to the spin model 20 and which has an axis of interest approximately parallel to the front face of the receiver (see FIGS. 3A and 3B). In FIGS. 3A and 3B, the letters A, B, C, D, E and F designate various distances of various targets 24 on the spin model 20 from the X-Z plane and the X-Y plane.

The data extracted from the optical receivers 26 mounted at the base of the spin tunnel 22 are employed not only to determine the spin rate of the spin model 20 but the data collected by these receivers will be used to select the proper perimeter receiver 26 whose data will be used to calculate the angle of attack and roll angle of the spin model 20. Data collected from these receivers yield the following information: quadrant location, yaw orientation, and distance from the X axis of the spin model 20 to a front face of an optical receiver 26. By knowing the distance of each target to the selected optical receiver 26, the resolution for that specific measurement (which yields a maximum accuracy achievable for that specific location) can be accurately calculated.

The electro-optical spin measurement system of the present invention replaces the present photographic method and provides the advantage of almost real-time solution with fast data turnaround, lower cost, and more accurate test results than prior art devices. The present invention can be employed for obtaining external store position metering relative to a wing reference plane for store separation tests. A store is a bomb or missile and the store separation test determines how fast the bomb or missile is travelling and the orientation of the bomb or missile as it is falling away from the aircraft. In addition, the present invention can be used to determine vertical lift for aircraft attitude and aircraft-to-deck closure speed inputs for automatic shipboard landing control systems. Further, the present invention can operate in hostile light environments and can be applied to other system requirements, i.e., low speed or high speed wind tunnel tests, model or structural flexing, short range space positioning, etc.

The foregoing is considered as illustrative only of the principles of the invention. Further, since numerous modifications and changes will readily occur to those skilled in the art, it is not desired to limit the invention to the exact construction and application shown and described. Accordingly, all suitable modifications and equivalents may be resorted to, falling within the scope of the invention and the appended claims and their equivalents.

What is claimed is:

1. An electro-optical spin measurement system for a spin model in a spin tunnel comprising:
    radio controlled receiver/transmitter means, located within the spin tunnel for transmitting and receiving signals;

target means, mounted on the spin model, for receiving signals from said radio controlled receiver/transmitter means and generating signals;

optical receiver means, mounted around the perimeter of the spin tunnel and at the base of the spin tunnel, for generating data by defining the position of the spin model in accordance with the signals received from said target means; and control means, connected to said radio controlled receiver/transmitter means and said optical receiver means for transmitting signals to said radio controlled receiver/transmitter means, accumulating data from said optical receiver means, and determining spin rate, angle of attack and roll angle of the spin model.

2. An electro-optical spin measurement system according to claim 1, wherein six target means are employed.

3. An electro-optical spin measurement system according to claim 2, wherein said target means include light emitting diodes (LEDs).

4. An electro-optical spin measurement system according to claim 3, wherein the spin model includes a fuselage, nose tip, wings, and tail, wherein two of said target means are mounted under the fuselage at the nose tip and tail, wherein two other said target means are mounted on the side of the fuselage at the nose tip and tail, and wherein a target means is located at each tip of the wings.

5. An electro-optical spin measurement system according to claim 4, wherein said two target means mounted under the fuselage the nose tip and tail allow for measurement of spin rate, wherein said two target means mounted on the side of the fuselage at the nose tip and tail allow for measurement of angle of attack, and wherein said two target means at said wing tips allow for measurement of roll angle.

6. An electro-optical spin measurement system according to claim 1, wherein said optical receiver means mounted around the perimeter of the spin tunnel are mounted at 90° increments with respect to each other for dividing the spin tunnel into four quadrants.

7. An electro-optical spin measurement system according to claim 6, wherein said optical receiver means mounted around the perimeter of the spin tunnel generate data for calculating angle of attack and roll angle of the spin model.

8. An electro-optical spin measurement system according to claim 7, wherein said optical receiver means mounted at the base of the spin tunnel generate data for calculating the spin rate of the spin model.

* * * * *